April 30, 1963     P. E. KNUTH ETAL     3,087,585
COVER FOR LAWN MOWERS

Filed June 30, 1961

INVENTORS
PAUL E. KNUTH
EARL F. COLLINS
HERMAN J. SMITH

BY *Wright Wright*

ATTORNEYS

United States Patent Office 3,087,585
Patented Apr. 30, 1963

3,087,585
COVER FOR LAWN MOWERS
Paul E. Knuth, Rte. 2, West Bend, Wis., and Earl F. Collins, 3009 N. Oakland, and Herman J. Smith, 7521 N. Mohawk Road, both of Milwaukee, Wis.
Filed June 30, 1961, Ser. No. 121,213
2 Claims. (Cl. 189—2)

This invention appertains to the protection of outdoor appliances, such as power lawn mowers, from the weather, when such appliances are not in use.

Owing to the size of power lawn mowers, much difficulty is experienced by householders in the proper storing thereof for protection against the elements. Usually, the garage is the logical place for storage, but due to the area required for such storage, the mower interferes with the parking of the automobile in a normal sized garage. The weight of a power lawn mower prohibits the easy picking up thereof for carrying back and forth from a basement or cellar. Thus, a serious problem exists in the proper protection of an expensive piece of equipment from the elements.

It is, therefore, one of the primary objects of the invention to provide a portable cover for power lawn mowers, which can be easily placed on and removed from the lawn mower and which when placed on the mower will effectively house and protect the body of the mower and all working parts, including the motor, from the elements, so as to insure a long life to the mower.

Another salient object of the invention is to provide a portable cover for power lawn mowers which will be light in weight for handling and one in which there are no moving parts, thereby rendering the same simple to manipulate to place on and off the mower.

A further important object of the invention is the provision of a cover, casing or housing, for a lawn mower embodying a top wall, side walls and one end wall, all rigidly connected together and preferably molded, case or stamped from a desired material to form an integral one-piece unit, with a flexible apron closing the end of the casing remote from the rigid end wall and having slots therein for receiving and snugly engaging the handle of a mower, whereby entrance of rain or the like into the casing is prevented.

A still further object of the invention is to shape the walls of the casing so that the same will blend together to form a streamlined appearance and to effectively shed the elements and to permit a plurality of the casings or covers to be nested together to save space during shipping and warehouse storing.

Figure 1:
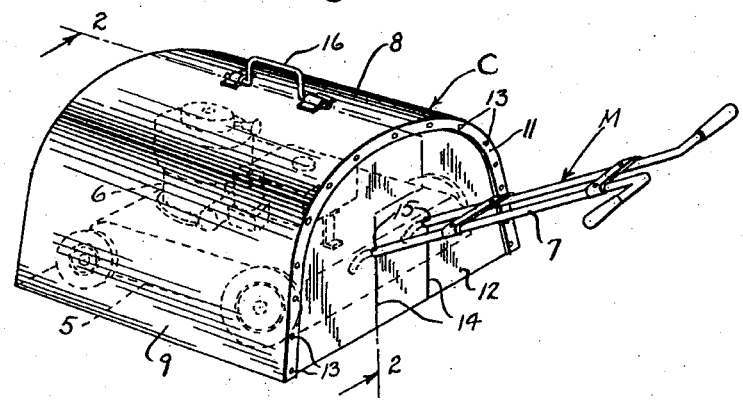
Figure 2:
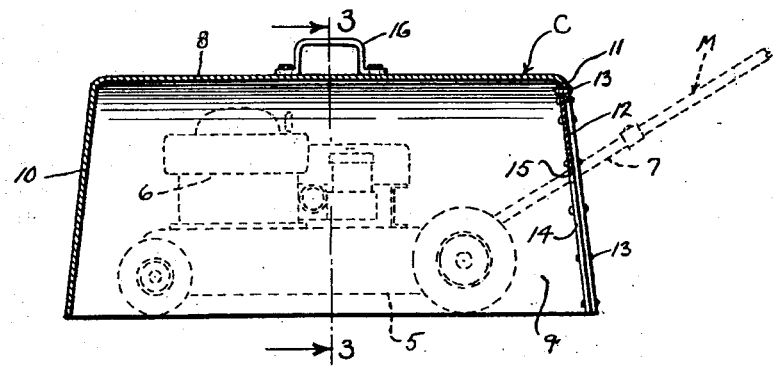
Figure 3:
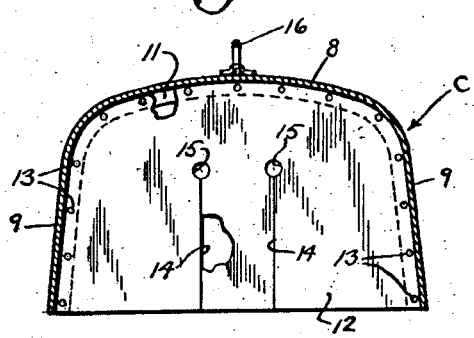

With these and other objects in view, the invention consists in the novel construction, arrangement and formation of parts, as will be hereinafter more specifically described and claimed, and illustrated in the accompanying drawing, in which drawing, FIGURE 1 is a perspective view of the improved cover associated with a power lawn mower;

FIGURE 2 is a longitudinal sectional view through the cover taken on the line 2—2 of FIGURE 1, looking in the direction of the arrows, the mower being shown in dotted lines, and FIGURE 3 is a transverse sectional view through the cover or casing taken on the line 3—3 of FIGURE 2, looking in the direction of the arrows.

Referring to the drawing in detail, wherein similar reference characters designate corresponding parts throughout the several views, the letter C generally indicates the improved cover or casing for the body portion of a power lawn mower M.

The power driven mower M forms no part of the present invention, and the same can be of any type or character now in general use. As illustrated, the mower M includes a wheeled body or chassis 5 having mounted thereon a motor 6 for driving the cutters, not shown, and a manipulating handle 7. The mower can be of the type in which the cutters are driven alone from the motor 6, or of the type in which the cutters and the wheels are power driven.

The cover or casing C is preferably of a size to accommodate mowers of different sizes and characters. As illustrated the cover or casing C includes a curved top wall 8, depending side walls 9 and an end wall 10. The end edges of the top and side walls 8 and 9 remote from the end wall 10 have formed thereon an inwardly extending flange 11. The cover can be made from any desired material, such as sheet metal, plastic or the like, and it can be molded, cast or stamped from this material. Thus the cover, with the exception of one end forms an integral unit. The curved top wall merges into the side walls 9 and end wall 10 to form a streamlined appearance, and to effectively shed rain and the like. The walls 9 and 10 are also preferably flared, outwardly and downwardly, and this also aids in the shedding of the elements and permits the covers or casings to be nested one within the other during shipping or warehouse storing.

Secured to the flange 11 is a flexible apron 12. The apron can be secured at its outer edges to the flange 11 in any preferred manner, such as by rivets 13. The apron can be formed from rubber or like material. The flexible apron 12 is provided with one or more slits 14 extending from the extreme lower edge thereof to a point short of the upper edge thereof. The slits preferably terminate into openings 15 of a size to receive and snugly embrace the handles 7 of the lawn mower. By having the slits 14 the cover or casing can be bodily lifted off of the lawn mower and the handles will slide through the slits 14. Likewise, the cover can be bodily placed on the mower by moving the cover or casing downward over the mower with the handles sliding through the slits 14 and into the openings 15. The slits will tend to automatically close after the passage of the handles therethrough so as to effectively prevent the entrance of rain and the like into the casing.

In actual practice, the flexible apron 12 can be sold without the slits therein, and purchasers of the covers can then make the slits and openings in the apron to suit the particular type of handle on the mower purchased.

To facilitate the handling of the cover or casing C, the top wall 8 thereof can be provided with a bale handle 16. When the covers or casings are nested for shipping or storing, the handles 16 can be swung down flat against the upper faces of the top walls.

From the foregoing description, it can be seen that we have provided a cover or casing for the body portions of lawn mowers, and that the cover or casing will effectively house the mower and thoroughly protect the same against the elements. As the cover completely envelopes the body portion of the mower, it can be seen that the cover also acts as a guard to prevent persons from coming into contact with the hot motor of the mower after a use of the mower. Obviously, due to the light weight of the cover, the same can be easily handled by a person irrespective of the age of such person.

As the cover can be raised straight off the mower or straight down over the mower, the manipulation of the cover is an easy one and there are no moving parts to handle.

Changes in details may be made without departing from the spirit or the scope of this invention, but what we claim as new is:

1. A portable cover for power lawn mowers of the type embodying a wheeled chassis and a manipulating handle comprising a main body portion including a top wall, side walls and an end wall, the edges of the top and side walls remote from the end wall being provided with an inwardly directed flange, all of said walls and said flange being rigidly connected together to form an integral unit, a manipulating handle for said unit, said top wall being curved transversely and said side walls flaring downwardly and outwardly from the curved top wall, said end wall being flared downwardly and outwardly, and a flexible apron closing the end of the casing remote from the end wall having its top and side edges rigidly secured to the flange, said casing being shaped to conform to the mower chassis to completely enclose said chassis and said flexible apron having at least one slit opening out through the lower edge of the apron and terminating short of the upper edge of the apron, said slit being adapted to receive the handle of the mower, and said apron also having an opening communicating with the upper end of the slit for snugly embracing the handle when the cover is placed over the chassis of the mower.

2. A portable cover for power lawn mowers of the type embodying a wheeled chassis and a handle comprising a body portion shaped to completely house the chassis of the mower and including a top wall, depending side walls and end walls, one of said end walls being provided with at least one slit extending upwardly from the lower edge thereof to snugly receive the handle of the lawn mower as the body is placed on the lawn mower.

References Cited in the file of this patent

UNITED STATES PATENTS

| | | |
|---|---|---|
| 479,942 | Holladay | Aug. 2, 1892 |
| 1,021,689 | Lyon | Mar. 26, 1912 |
| 2,490,250 | Boehner | Dec. 6, 1949 |
| 2,708,927 | Dixon et al. | May 24, 1955 |
| 2,790,414 | Rossow | Apr. 30, 1957 |